US006895814B2

(12) United States Patent
Benz

(10) Patent No.: US 6,895,814 B2
(45) Date of Patent: May 24, 2005

(54) METHOD AND DEVICE FOR MEASURING LEVELS

(75) Inventor: Joachim Benz, Hausach (DE)

(73) Assignee: VEGA Grieshaber KG, Wolfach (DE)

( * ) Notice: Subject to any disclaimer, the term of this patent is extended or adjusted under 35 U.S.C. 154(b) by 232 days.

(21) Appl. No.: 10/190,704

(22) Filed: Jul. 9, 2002

(65) Prior Publication Data

US 2003/0024306 A1 Feb. 6, 2003

(30) Foreign Application Priority Data

Jul. 11, 2001 (DE) .......................................... 101 33 081

(51) Int. Cl.⁷ ............................................ G01F 23/00
(52) U.S. Cl. .................................. 73/290 V; 73/290 R
(58) Field of Search ........................... 73/290 V, 290 R

(56) References Cited

U.S. PATENT DOCUMENTS

| | | | |
|---|---|---|---|
| 5,452,611 A | * 9/1995 | Jones et al. ................ | 73/290 V |
| 5,587,969 A | 12/1996 | Kroemer et al. | |
| 5,614,911 A | 3/1997 | Otto et al. | |
| 5,755,136 A | * 5/1998 | Getman et al. ............ | 73/290 V |
| 5,822,275 A | 10/1998 | Michalski | |
| 6,295,874 B1 | * 10/2001 | Strutt et al. ................ | 73/597 |
| 6,415,660 B1 | * 7/2002 | Sinz et al. ................. | 73/290 R |

FOREIGN PATENT DOCUMENTS

| | | |
|---|---|---|
| DE | 43 32 071 | 3/1995 |
| DE | 44 07 369 | 9/1995 |
| DE | 195 38 680 | 4/1997 |

* cited by examiner

*Primary Examiner*—Hezron Williams
*Assistant Examiner*—Rodney T. Frank
(74) *Attorney, Agent, or Firm*—Nath & Associates PLLC; Marvin C. Berkowitz

(57) ABSTRACT

A level indicator emits measuring pulses (M) onto the surface (O) of a material (F) that is filled into a container, wherein second echo pulses (E2) are directly reflected at the surface of the material to the transmitting and receiving antenna (A) of the level indicator. Third echo pulses (E3) are reflected by the container wall (BW) and then to the transmitting and receiving antenna (A) due to diffuse reflection on the surface (O). First echo pulses (E1) are reflected at exposed parts, e.g., welding seams (SW) of the container wall (BW), to the transmitting and receiving antenna (A). The echo pulses (E1, E2, E3) received by the transmitting and receiving antenna (A) are low-pass filtered by means of a preferably digital low-pass filter (TP) and then evaluated in an evaluation unit (AW). Due to this low-pass filtering, the second and the third echo pulses (E2, E3) are combined into a single echo pulse (EV). The level indicator is particularly suitable for measuring the level (H) of pourable solids (F).

22 Claims, 2 Drawing Sheets

METHOD AND DEVICE FOR MEASURING LEVELS

DESCRIPTION

Figure 1:
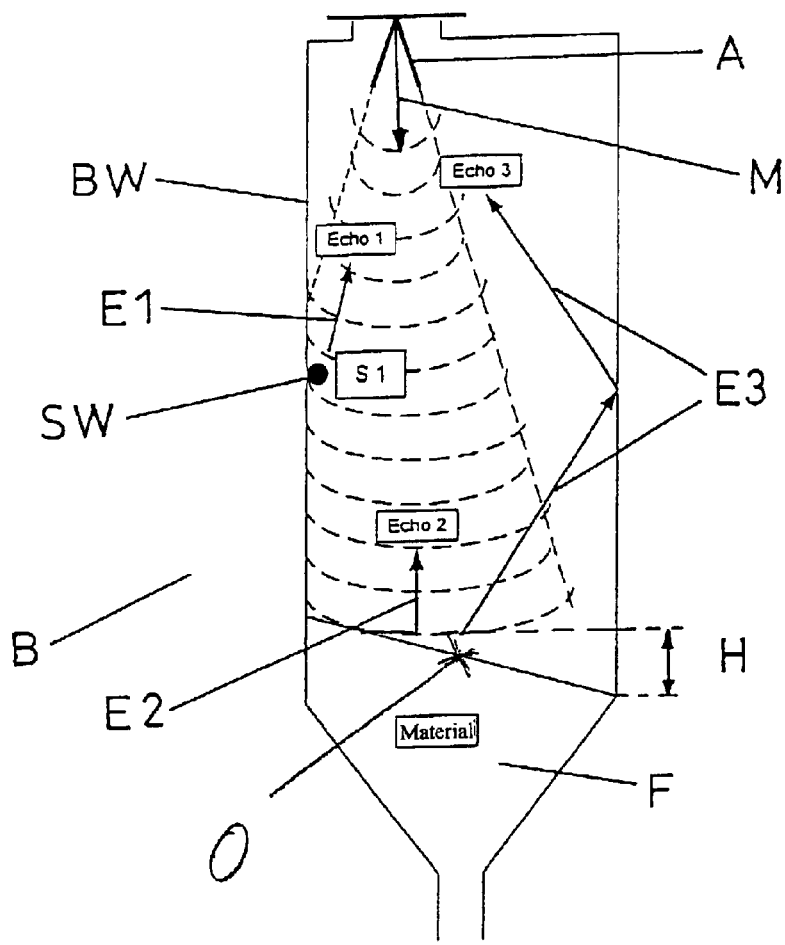

The invention pertains to a method for measuring fill levels by means of a level indicator that emits measuring pulses onto the surface of a material that is filled into a container and receives the measuring pulses reflected by the surface of the material, so-called echo pulses, in order to determine the fill level of the material in the container from the transit time of the measuring pulses.

The invention also pertains to a level indicator for emitting measuring pulses onto the surface of a material that is filled into a container, for receiving the measuring pulses reflected by the surface of the material, so-called echo pulses, and for determining the transit time of the measuring pulses in order to determine the fill level of the material in the container.

When determining the fill level of a material that is filled into a container and that may consist of a pourable solid or a liquid, measuring pulses are emitted onto the surface of the material by a level indicator. The emitted measuring pulses are reflected back to the level indicator by the surface of the material and received by a receiver. The current level of the material in the container is determined by measuring the transit times of the measuring pulses.

It is preferred to utilize level indicators that emit ultrasonic pulses or electromagnetic pulses, as is the case with a radar device.

However, the measuring pulses received by the level indicator are superimposed with interference, e.g., interference echoes, and may also be corrupted. For example, dust above the surface of the material and diffuse reflections on the surface of the material which occur when filling and emptying the container lead to a strong attenuation of the reflected measuring pulses.

When measuring the level of a material that is filled into a container, three different superimposed echo pulses are generated. The second echo pulse is generated due to the direct reflection of the emitted measuring pulse from the surface of the material directly to the transmitting and receiving antenna of the level indicator. The third echo pulse is generated due to the diffuse reflection of the measuring pulse from the surface of the material and the subsequent partial reflection or even multiple reflections at the container wall. Finally, the first echo pulse is generated due to the reflection of the emitted measuring pulse on the container wall, e.g., at welding seams, rivets, screws or the like.

A precise measurement of the level of pourable solids is further impaired in that the amplitude of the second echo pulse—i.e., the measuring pulse that is directly reflected from the surface of the material to the transmitting and receiving antenna—is usually less than the amplitude of the third echo pulse—the measuring pulse that is indirectly reflected at the container wall to the transmitting and receiving antenna. Since no well-defined measuring pulse is reflected back to the transmitting and receiving antenna of the level indicator, the fill level of the material in the container must be determined from the composite signal of the received echo pulses in the level indicator.

Consequently, the invention is based on the objective of achieving the most precise measuring result possible despite these numerous interfering influences.

With respect to the method, the objective of the invention is realized in that the received measuring pulses are filtered by means of a low-pass filter and then evaluated.

With respect to the device, the objective of the invention is realized in that the output of the receiver is connected to the input of a low-pass filter, the output of which is connected to the input of an evaluation unit, where the output of the evaluation unit is connected to the input of an output unit.

Due to the innovative measure of filtering the received composite signal by means of a low-pass filter, the second and the third echo pulse—the measuring pulse that is directly reflected by the surface of the material to the transmitting and receiving antenna and the measuring pulse that is diffusely reflected at the surface of the material to the container wall and that is then received by the transmitting and receiving antenna—are combined into a single echo pulse. The invention is based on the concept that the amplitude of the third echo pulse—the measuring pulse that is diffusely reflected from the surface of the material of the container wall and then received by the transmitting and receiving antenna—is significantly higher than the amplitude of the first and second echo pulses. Due to the combining of the second and third echo pulses by means of the low-pass filter, only two echo pulses of significantly different amplitude are formed, where the transit times of these two echo pulses can be determined much more easily than is the case with the initially described composite signal consisting of three echo pulses. A particularly high measuring accuracy is achieved if the transit time of the combined echo pulse consisting of the second and third echo pulses is measured instead of the transit time of the first echo pulse since the amplitude of the combined echo pulse is significantly higher than that of the first echo pulse.

The measuring accuracy can be additionally increased by pre-filtering the composite signal delivered by the transmitting and receiving antenna by means of a bandpass filter arranged upstream of the low-pass filter. An additional improvement in the measuring accuracy can be achieved if the composite signal that was pre-filtered by means of the bandpass filter is rectified by means of a rectifier before it is filtered by means of the low-pass filter. An analog/digital conversion of the rectified composite signal by means of an analog/digital converter further increases the measuring accuracy because a digital low-pass filter can be used instead of an analog low-pass filter in this case. This makes it possible to achieve the advantages described below.

Depending on the reflection characteristics of the material and the container wall, the cut-off frequencies of the digital low-pass filter can be selected to be identical or different for rising and falling amplitudes of the echo pulses to be analyzed. The method according to the invention and the level indicator according to the invention consequently can be individually adapted to the respective materials and containers.

The second and third echo pulses or only the second echo pulse may be evaluated by the evaluation unit. In this case, it is preferred to evaluate the rising amplitude of the echo pulses.

Depending on the reflection capacity of the material and the container wall, it may be reasonable to shape and evaluate the generating curves of an envelope of the measuring pulses.

The invention is described in greater detail below with reference to the figures.

Figure 2:
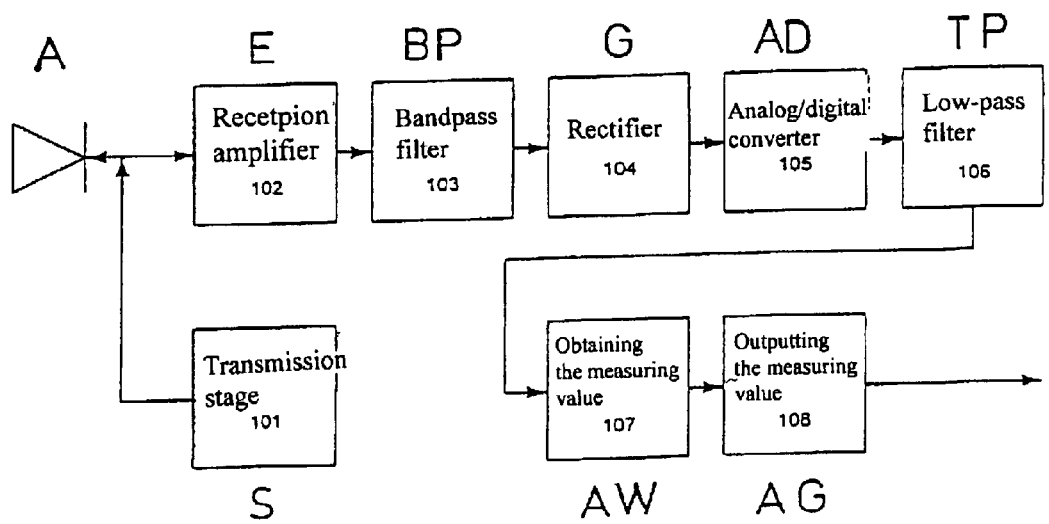
Figure 3:
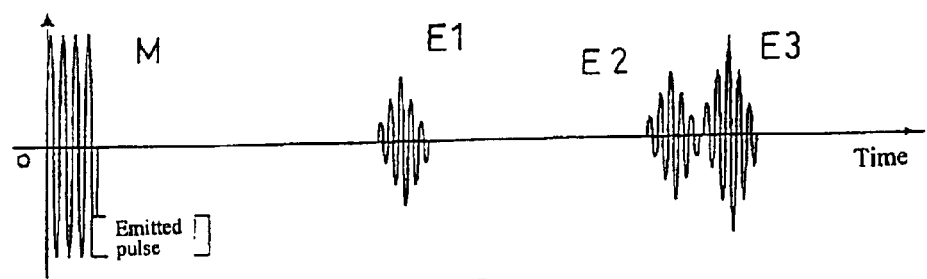
Figure 4:
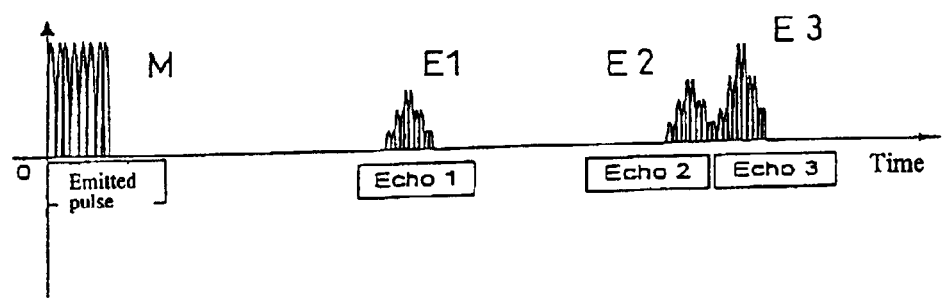
Figure 5:
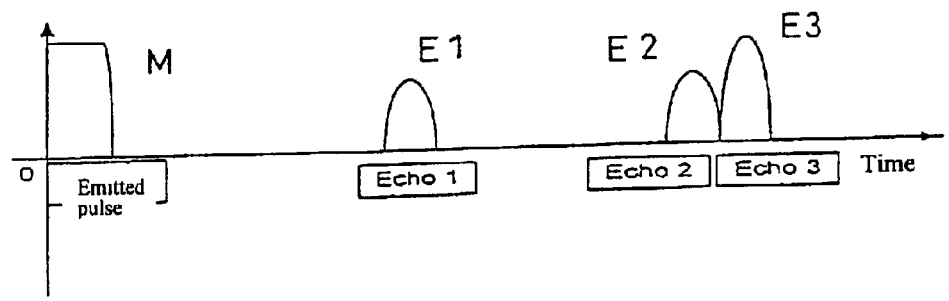

The figures show:

FIG. 1, a container that is a partially filled with a material, and the transmitting and receiving antenna of the level indicator;

FIG. 2, a circuit diagram of an embodiment of a level indicator according to the invention;

FIG. 3, the time history of the measuring pulses at the output of the transmitting and receiving antenna;

FIG. 4, the time history of the measuring pulses after pre-filtering and rectification;

FIG. 5, the envelopes of the measuring pulses shown in FIG. 4, and

Figure 6:
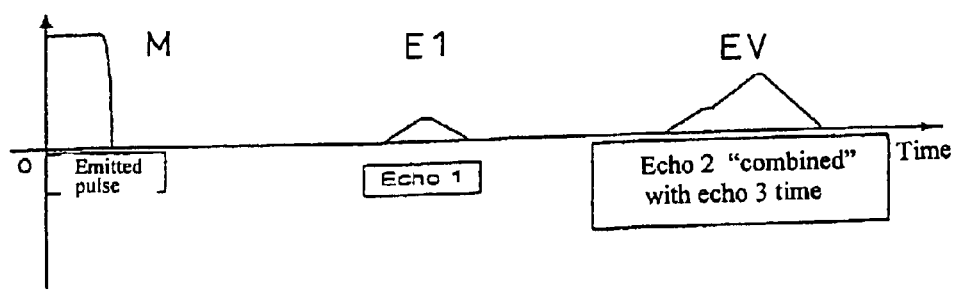

FIG. 6, the envelopes of the measuring pulses at the output of the low-pass filter after low-pass filtering.

FIG. 1 shows a container B, on the upper end of which the transmitting and receiving antenna A of the level indicator according to the invention is arranged. One part of the measuring pulses M emitted by the transmitting and receiving antenna A is directly reflected at the surface O of the material F back to the transmitting and receiving antenna A in the form of an echo pulse E2. Another part of the measuring pulses M emitted by the transmitting and receiving antenna A is diffusely reflected at the container wall BW on the surface O of the material in the form of an echo pulse E3 and then to the transmitting and receiving antenna A. A third part of the measuring pulses M emitted by the transmitting and receiving antenna A is indirectly reflected back to the transmitting and receiving antenna A by exposed parts of the container wall BW, e.g., welding seams SW.

FIG. 2 shows a circuit diagram of an embodiment of the level indicator according to the invention.

The transmitting and receiving antenna A is connected to the input of a receiver E and to the output of a transmitter S. The output of the receiver E is connected to the input of a bandpass filter BP, the output of which is connected to the input of a rectifier G. The output of the rectifier G is connected to the input of an analog/digital converter, the output of which is connected to the input of a low-pass filter TP. The output of the low-pass filter is connected to the input of an evaluation unit AW, the output of which is connected to the input of an output unit AG.

The embodiment of a level indicator according to the invention which is shown in FIG. 2 is described below with reference to the measuring pulse diagrams illustrated in FIGS. 3–6.

The pulse diagram according to FIG. 3 shows the time history of the measuring pulse M emitted by the transmitting and receiving antenna A, as well as the time histories of the echo pulses E1, E2 and E3 received by the transmitting and receiving antenna A. One can clearly see that the amplitude of the echo pulse E2 [sic; E1] caused by an indirect reflection at an exposed part, e.g., a welding seam SW of the container wall BW, is approximately identical to the amplitude of the echo pulse E2 caused by the direct reflection at the surface O of the material F. However, the amplitude of the echo pulse E3 caused by the diffuse reflection on the surface O of the material F and the subsequent reflection on the container wall BW is significantly higher than the amplitudes of the two echo pulses E1 and E2.

The pulse diagram according to FIG. 4 shows the time histories of the measuring pulses M, E1, E2 and E3 which are amplified by the receiver, subsequently pre-filtered by means of the bandpass filter BP and ultimately rectified by means of the rectifier G. However, rectification and the bandpass filtering are not absolutely imperative.

The pulse diagram according to FIG. 5 shows the envelopes of the measuring pulses M, E1, E2 and E3.

The pulse diagram according to FIG. 6 shows the time histories and the envelopes of the measuring pulses M, E1, E2 and E3 at the output of the low-pass filter TP. Due to the low-pass filtering by means of the low-pass filter TP, the two echo pulses E2 and E3 are combined into one echo pulse EV, the amplitude of which is significantly higher than that of the echo pulse E1.

Depending on the reflection capacity of the material and the container wall, the level of the material is determined by means of the combined echo pulse EV or the echo pulse E3. It is preferred to evaluate the rising edges of the amplitudes in the evaluation unit AW. The determined level H is visually displayed by means of the output unit AG.

The level indicator according to the invention may be realized in accordance with analog or digital technology. As mentioned above, the digital variation can be individually adapted to the specific reflection characteristics of the material F and the container wall BW by correspondingly selecting the cut-off frequencies of the digital low-pass filter and by evaluating the measuring pulses and the echo pulses differently in a digital evaluation unit AW. The method according to the invention and the corresponding level indicator are particularly suitable for measuring the level of pourable solids in a container.

List of reference symbols

| | |
|---|---|
| A | Transmitting and receiving antenna |
| AD | Analog/digital converter |
| AG | Output unit |
| AW | Evaluation unit |
| B | Container |
| BP | Bandpass filter |
| BW | Container wall |
| E | Receiver |
| EV | Combined echo pulse |
| E1 | Measuring pulse reflected at the container wall |
| E2 | Measuring pulse reflected at the surface of the material |
| E3 | Measuring pulse diffusely reflected at the surface of the material and subsequently at the container wall |
| F | Material |
| G | Rectifier |
| H | Level |
| M | Emitted measuring pulse |
| O | Surface of the material |
| S | Transmitter |
| SW | Welding seam |
| TP | Low-pass filter |

What is claimed is:

1. Method for measuring fill levels by means of a level indicator that emits measuring pulses (M) onto a surface (O) of a material (F) that is filled into a container (B) and receives first echo pulses (E2) directly reflected by the surface (O) of the material (F), and second echo pulses (E3) caused by a diffuse reflection on the surface (O) of the material (F) and by a subsequent reflection on a container wall (BW), in order to determine the fill level (H) of the material (F) from the transit time of echo pulses (E2, E3), whereby: the first and second echo pulses (E2, E3) are filtered by means of a low-pass filter (TP) for providing a single combined echo pulse, which is subsequently evaluated for determining a fill level.

2. Method according to claim 1, characterized by the fact that the measuring pulses (E1, E2, E3) received by the transmitting and receiving antenna (A) are pre-filtered by means of a bandpass filter (BP) before low-pass filtering by means of the low-pass filter (TP).

3. Method according to claim 1, characterized by the fact that the received measuring pulses (E1, E2, E3) are rectified by means of a rectifier (G) before low-pass filtering by means of the low-pass filter (TP).

4. Method according to claim 1, characterized by the fact that the received measuring pulses (E1, E2, E3) are digitized by means of an analog/digital converter (AD) before low-pass filtering by means of the low-pass filter (TP).

5. Method according to claim 1, characterized by the fact that the envelope of the measuring pulses (M, E1, E2, E3) is formed.

6. Method according to claim 4, characterized by the fact that a digital filter is used as the low-pass filter (TP).

7. Method according to claim 6, characterized by the fact that the cut-off frequencies of the digital low-pass filter (TP) are chosen to be identical for rising and falling amplitudes.

8. Method according to claim 6, characterized by the fact that the cut-off frequencies of the digital low-pass filter (TP) are chosen to be different for falling and rising amplitudes.

9. Method according to claim 1, characterized by the fact that the measuring pulse reflected at the container wall (BW), the echo pulse (E1) and the measuring pulse that is diffusely reflected on the surface (O) of the material (F) and subsequently at the container wall (BW), i.e., the echo pulse (E3), are evaluated in the evaluation unit (AW).

10. Method according to claim 1, characterized by the fact that the measuring pulse reflected at the container wall (BW), i.e., the echo pulse (E2), is evaluated in the evaluation unit (AW).

11. Method according to claim 1, characterized by the fact that the rising edges of the reflected measuring pulses, i.e., the echo pulses (E2, E3), are evaluated.

12. Method according to claim 1, characterized by the fact that the measuring pulses received by the transmitting and receiving antenna (A) are amplified in the receiver (E).

13. Method according to claim 1, characterized by the fact that the emitted measuring pulses (M) consist of electromagnetic pulses or ultrasound pulses.

14. Method according to claim 13, characterized by the fact that the frequency of the electromagnetic measuring pulses (M) is in the microwave range.

15. Level indicator for transmitting measuring pulses (M) onto a surface (O) of a material (F) that is filled into a container (B), for receiving first echo pulses (E2) directly reflected by the surface (O) of the material (F) and second echo pulses (E3) caused by a diffuse reflection on the surface (O) of the material (F) and by a subsequent reflection on a container wall (BW), and for determining the transit time of the echo pulses (E2, E3) in order to determine the fill level (H) of the material (F) in the container (B), wherein a transmitter (S) that generates measuring pulses (M) and a receiver (E) that receives the reflected echo pulses (E2, E3) are connected to a transmitting and receiving antenna (A), characterized by the fact that the output of the receiver (E) is connected to the input of a low-pass filter (TP) that filters the first and second echo pulses (E2, E3) and outputs a single combined echo pulse, the output of which is connected to the input of an evaluation unit (AW), and by the fact that the output of the evaluation unit (AW) is connected to the input of an output unit (AG).

16. Level indicator according to claim 15, characterized by the fact that a bandpass filter (BP) is arranged between the receiver (E) and the low-pass filter (TP).

17. Level indicator according to claim 15, characterized by the fact that a rectifier (G) is arranged between the receiver (E) and the low-pass filter (TP).

18. Level indicator according to claim 15, characterized by the fact that an analog/digital converter is arranged upstream of the low-pass filter (TP) that is realized in the form of a digital filter.

19. Level indicator according to claim 18, characterized by the fact that the output of the receiver (E) is connected to the input of the bandpass filter (BP), the output of which is connected to the input of the rectifier (G), and by the fact that the output of the rectifier (G) is connected to the input of the analog/digital converter (AD), the output of which is connected to the input of the digital low-pass filter (TP).

20. Level indicator according to claim 18, characterized by the fact that the cut-off frequencies of the digital low-pass filter (TP) are chosen to be identical or different for rising and falling amplitudes.

21. Level indicator according to claim 15, characterized by the fact that the emitted measuring pulses (M) consist of electromagnetic pulses or ultrasound pulses.

22. Level indicator according to claim 21, characterized by the fact that the frequency of the electromagnetic measuring pulses (M) is in the microwave range.

* * * * *